3,462,604
CONTROL APPARATUS SENSITIVE TO
EYE MOVEMENT
Kenneth A. Mason, Boston, Mass., assignor to Honeywell
Inc., Minneapolis, Minn., a corporation of Delaware
Filed Aug. 23, 1967, Ser. No. 662,816
Int. Cl. H01j 39/12
U.S. Cl. 250—206    3 Claims

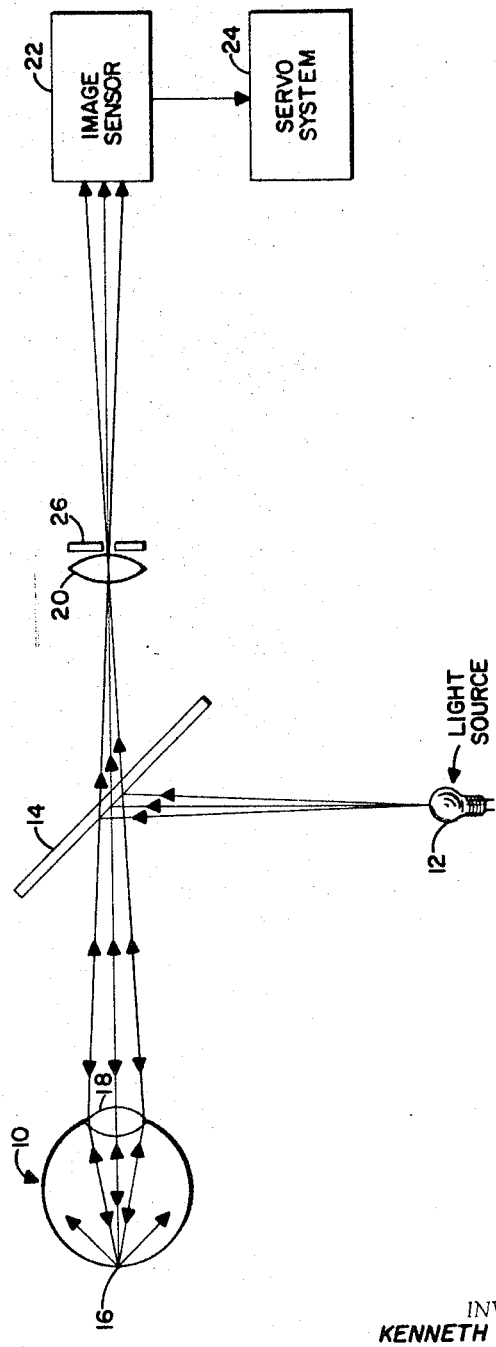

ABSTRACT OF THE DISCLOSURE

An oculometer for determining the orientation of an eyeball by measuring the position of the image of light reflected from the retina of the eye relative to the position of the image reflected from the front surface of the eye.

BACKGROUND OF THE INVENTION

To improve the effectiveness of aircraft pilots it is advantageous to provide them with apparatus so that they may aim their weapons without using their hands. In the prior art optical systems have been suggested to measure the position of the pilot's eyes so as to determine the direction in which he is looking and to automatically point guns or other weapons in that direction. Of course, it is readily apparent that such a device would have many industrial applications, also, allowing machine operators to control various functions without using their hands. The disadvantage of prior art systems is that they utilize light reflected only from the front region of the eye and measure the position of the dark pupil with respect to the rest of the eyeball. Since it is difficult to track a dark area in the midst of a variably bright background the prior art devices do not work as well as is desired.

SUMMARY OF THE INVENTION

Briefly, the present invention comprises an optical system in which light is directed to the eyeball where it is reflected by both the front surface and the retina at the back of the eye. The light from inside the eye returns along with light from the front of the eye and a detecting system sees both images as a uniformly bright pupil against a dark background with a brighter front surface image inside the pupil image. This image is much more clearly defined and easily tracked and provides a superior system for measuring the direction in which the subject is looking. Consequently, it is an object of the present invention to provide an improved oculometer for use in measuring the position of an eyeball so as to control machines or weapons accordingly. Other objects and advantages will become apparent to those skilled in the art upon consideration of the following description and drawing.

BRIEF DESCRIPTION OF THE DRAWING

The drawing is a schematic diagram showing the major optical components of my invention.

DESCRIPTION OF THE PREFERRED EMBODIMENT

In the drawing an eyeball 10 is schematically shown. Light from a source 12 is reflected by a beam splitter 14 into the lens 18 of eye 10 where it is focused onto a small area 16 on the retina of eye 10. The angular size of the light source 12, to the eyeball 10, should be less than two degrees. A fraction of the radiation incident at the retina is scattered back from area 16 and collected by the eye lens 18. The rays collected by lens 18 which come from area 16 follow the same paths as the incoming rays and, therefore, are refracted back along the identical paths towards beam splitter 14. In addition, light is reflected from the front surface of the eyeball 10 and also returns to beam splitter 14. The returning rays pass through beam splitter 14 to a lens 20 which is located at the virtual image of light source 12 in the beam splitter. Aperture 26, with an area equal to the luminous area of light source 12, is placed next to lens 20 so as to allow the passage of the rays from eye 10. The power of lens 20 is chosen to cause the images to be focused onto the face of an image sensor 22. Image sensor 22 may be an image dissector, or a group of detectors or sensors or any other sensor or sensors to measure the position of the images coming from the eye. In one preferred embodiment sensor 22 is an image dissector which operates to measure the position of the image of the pupil or eye 10 together with the position of the front surface image in order to determine the direction in which the subject is looking. A circular edge scan is used to measure the distance between the centers of the two images as an indication of the direction the eye is looking. However, any detection scheme may be used. This information is transmitted to a servo system 24 which operates to automatically aim weapons, automatically control some machine, or perform any other function desired in the particular application employed.

It is evident that various modifications may be made to the apparatus disclosed herein without departing from the spirit and scope of the invention. For example, if the head of the subject is stationary the displacement of the image reflected from inside the eye will be proportional to the direction the eye is looking so that it becomes unnecessary to measure the position of the image reflected from the front surface. Consequently, I do not intend the present invention to be limited to the particular embodiment and apparatus shown in the drawing except as defined by the appended claims.

I claim:
1. An oculometer comprising in combination:
  means for illuminating the retina and pupil of an eye;
  optical means for focusing the light which is reflected from the retina through the eye lens to an image plane;
  sensing means in the image plane for measuring the position of light reflected from the front surface of the eye relative to the image of light reflected from the retina as an indication of the position of the eye; and
  means connected to said sensing means for performing a control function dependent upon the position of the eye.
2. The apparatus of claim 1 in which said illuminating means comprises a source of light and a beam splitter positioned to reflect light from said source onto and into the eye and said optical means comprises a collecting lens positioned at the virtual image of the light source in the beam splitter and said sensing means comprises an image dissector.

3. The apparatus of claim 2 including a small aperture positioned adjacent to said collecting lens operable to pass light reflected from the retina of the eye and light reflected from the front surface of the eye.

References Cited

UNITED STATES PATENTS

| Re. 24,197 | 8/1956 | Skolnick | 340—279 |
| 2,327,612 | 8/1943 | Stone et al. | 351—7 |
| 3,000,255 | 9/1961 | Iddings | 250—203 X |
| 3,379,885 | 4/1968 | Nork. | |

JAMES W. LAWRENCE, Primary Examiner

D. O'REILLY, Assistant Examiner

U.S. Cl. X.R.

250—221; 340—279; 351—6